March 4, 1924.
B. H. CHAPPELL
1,485,483
INTERNAL COMBUSTION ENGINE
Filed May 3, 1919 2 Sheets-Sheet 1
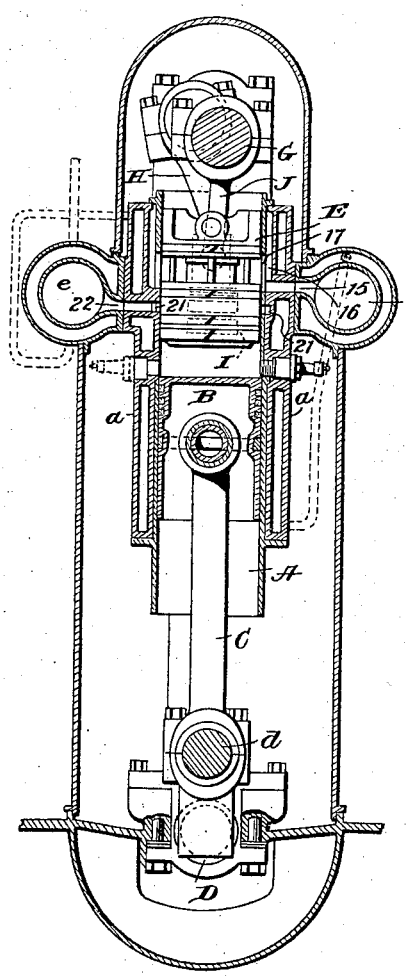
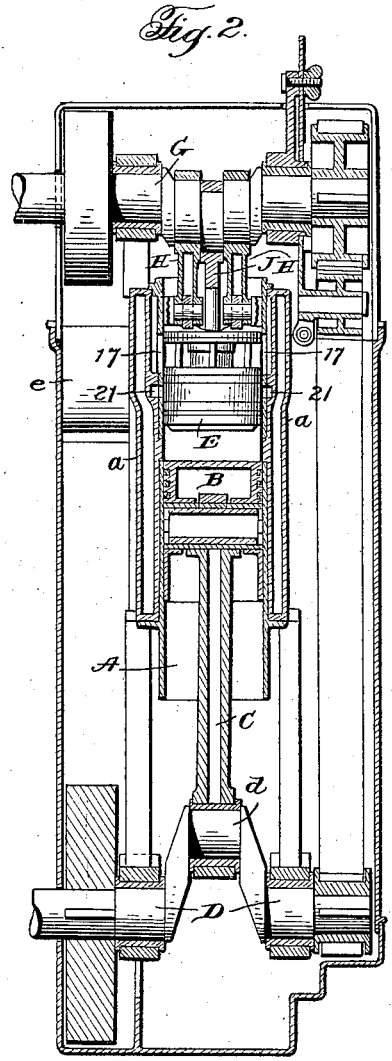

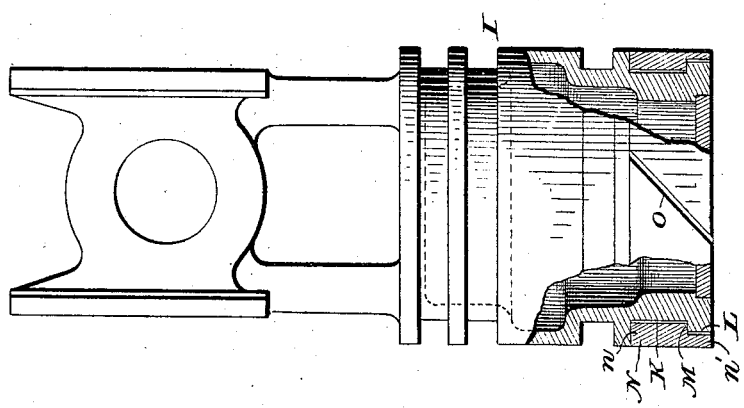
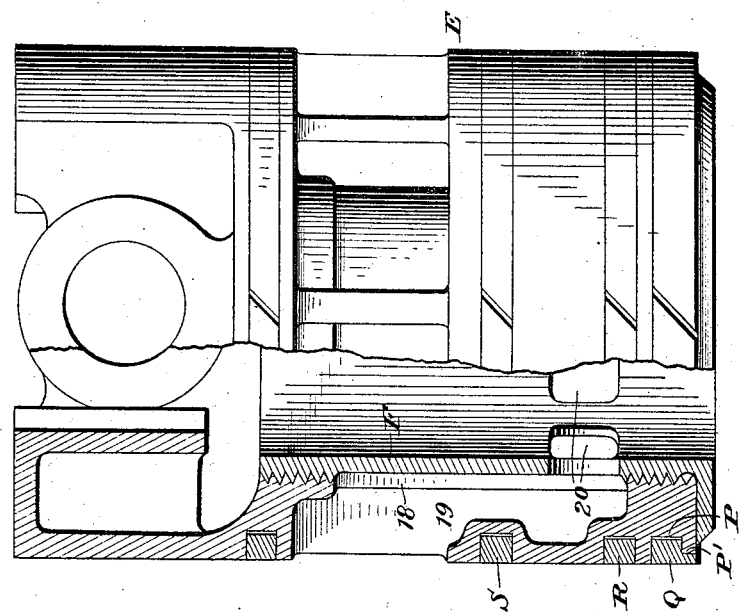

Patented Mar. 4, 1924.

1,485,483

UNITED STATES PATENT OFFICE.

BARTLETT HOMER CHAPPELL, OF NEW YORK, N. Y., ASSIGNOR TO WILLIAM GRANT BROWN, OF NEW YORK, N. Y.

INTERNAL-COMBUSTION ENGINE.

Application filed May 3, 1919. Serial No. 294,402.

*To all whom it may concern:*

Be it known that I, BARTLETT H. CHAPPELL, citizen of the United States, residing at 402 West 153rd Street, in the city of New York, in the county of New York and State of New York, have invented certain new and useful Improvements in Internal-Combustion Engines, of which the following is a specification, reference being had therein to the accompanying drawing.

This invention relates to internal combustion engines, and more particularly to novel and improved piston valve parts for engines of this type.

The improvements are more especially designed for use in connection with an engine of the type illustrated in the patent to Milan W. Hall, No. 1,284,190, in which the inlet and exhaust valves take the form of pistons working one within the other and adapted to receive the pressure of the expanding gases whereby a considerable proportion of the total power of the motor is developed against the piston valves. The valves are connected to a valve crank shaft, suitably geared to the main crank shaft so as to turn at half the speed of the latter and the valve, instead of being moved by power taken from the main crank shaft, are impelled forcibly by the explosions and become power-generating members of the engine.

It has been ascertained after considerable experimentation and use of the "Hall" type of engine that while the same has proven highly satisfactory, at the same time, the particular construction and arrangement of packing for the valve pistons has considerable to do with the efficiency of the engine, and some considerable difficulty has been encountered in the proper timing of the motor where the piston rings are located any appreciable distance from the end of the intake and exhaust piston, and it has further been ascertained that by positioning a piston ring directly at the compression end of the intake and exhaust piston and substantially flush with the end of the piston that control the timing of the opening and closing of the exhaust port and the opening and closing of the intake port of an internal combustion four cycle engine of the character under consideration, the difficulties heretofore experienced have been overcome, and an engine of vastly increased efficiency has resulted.

The invention is of particular importance, as above suggested, in connection with engines of the general character illustrated and described in the Hall patent referred to, where the piston is used in timing the opening and closing of the inlet and exhaust ports, and by the arrangement of the piston packing at the point contemplated by me, it makes possible the shortest throw to the valve shaft which operates or is operated by the valve. When the piston moves to a point so that the bottom or compression end uncovers the port, it is not necessary to move the piston any further, since the packing is located at this point, and otherwise it would be necessary to move the piston a sufficient distance to entirely uncover the port, in other words, advantages taken of the distance usually allowed between the end of the piston and the first ring.

It is further proposed by the invention, in an effort to improve the efficiency of engines of the particular type under consideration to provide a novel arrangement of packing rings at points removed from the end of the exhaust piston, and in this connection a packing ring is provided conveniently located in a position to travel between the intake and exhaust ports, thereby preventing the sucking in of any exhaust gases when the power piston is moving outwardly or down on its intake stroke.

It is believed that the various advantages of the improvements contemplated herein, will be appreciated from the description to follow, which, for a clear understanding of the invention, is to be considered in connection with the accompanying drawing, forming a part hereof, and wherein is disclosed, for the purpose of illustration, a convenient and satisfactory embodiment of the invention.

In the drawings,

Figure 1 is a vertical transverse section.

Figure 2 is a vertical longitudinal mid-section, and,

Figures 3 and 4 are detail enlarged views of the inlet and exhaust piston valves and associated parts, cut away.

In the drawings, A is an engine cylinder; and B a piston or plunger connected by the usual pitman C, with the crank *d* on the crank shaft D. The cylinder A is extended upwardly a considerable distance above the top stroke of the plunger, and within this extended portion, is adapted to slide a plunger-shaped piston ring E which constitutes the exhaust valve. This valve is formed annularly, having an inner cylindrical portion F, within which moves a plunger-shaped piston valve I which constitutes the inlet valve. The exhaust valve E and inlet valve I are connected to cranks or eccentrics on the valve shaft G by means of pitmen H and J respectively. It is obvious of course that cranks may be used instead of eccentrics.

The inlet conduit or inlet manifold $i$ is extended horizontally along one side of the engine, and the exhaust conduit or manifold $e$ is extended along the opposite side. From the inlet conduit $i$ there leads an inlet passage 15 extending through the cylinder jacket $a$ and communicating with an annular cavity 16 between this jacket and the lining F, and thence with a prolonged port opening 17 in this lining, whence the inflowing mixture passes by a port 18 in the outer side of the exhaust valve E into an annular chamber 19 in said valve, and thence by an inlet port 20, when said port is uncovered by the inlet valve I.

The exhaust conduit $e$ communicates with the cylinder through an exhaust port 21 which is best extended annularly around the cylinder through its lining $f$ and coinciding groove in the jacketed casing and through an exhaust passage 22.

It will be understood that the valves E and I are reciprocally-acting slide-valves which for convenience and symmetry are developed annularly into cylindrical form.

It is believed to be unnecessary to describe in detail more than has already been done the construction and operation of the engine parts above referred to in view of the full and detailed description in the Hall patent alluded to, suffice it to say that the piston valves within the main cylinder afford the sole control for the inlet and the exhaust and by reason of the connection of said valves with the valve shaft, the piston valves are adapted to recede during the power stroke whereby to communicate power to the valve shaft, and said valves cooperating to control the inlet whereby one of said valves, namely the valve I acts alone to control the exhaust.

Now in order to provide tight joints, to insure proper timing of the opening and closing of the piston valves that in order to provide the shortest throw to the pistons, a novel construction and arrangement of packing rings is provided, preferably as follows: Adjacent the bottom end, or compression end of the inlet piston valve I there is provided a relatively wide annular groove K connecting with a relatively narrow peripheral cutout part L by an offset shoulder M. A packing ring N having an upper thickened part $n$ adapted to fit within the annular groove K is provided, the thickened part connecting with a relatively thin part $n'$ engaging in the space of the cut out part L of the piston. The thickened part of the piston packing N at its point of connection with the relatively thin portion forms a shoulder to contact with the shoulder M of the piston whereby to maintain the ring in place. The ring is preferably split transversely at an angle as indicated at O, and the outer periphery of the ring is otherwise continuous and smooth and substantially flush with the outer periphery of the piston and also substantially flush with the compression end of the piston, and in effect constitutes a portion of the end of the piston.

Likewise, the piston E is provided at its lower end with a peripheral groove portion P connecting with a relatively narrow peripheral cut out portion P′ for the reception of a packing ring Q of similar design and construction as the packing ring N heretofore described. The piston E may, and preferably does have auxiliary piping rings R and S respectively, the packing ring S being positioned adjacent the lower edge wall surrounding the opening 18, whereas the packing R is arranged adjacent the end ring Q.

It has been seen that the piston valves afford the sole control for the inlet and exhaust gases, and by the provision of the packing at the extreme compression end of the piston, accomplishes the function of opening and closing the inlet of the exhaust ports located in the cylinder walls which they pass at a given time. Likewise, as previously alluded to, the arrangement of piston and rings gives the shortest throw to the valve shaft, since if they were arranged as at other points it would be necessary to move the piston just that much further to entirely uncover the port, in other words advantage is taken of the distance usually allowed between the end of the pistons and the first ring, and by making this change it is possible to time the motor properly, whereas before with the rings spaced from the end of the piston the timing operation presented numerous difficulties. In this same connection, it may be observed that by the peculiar location of the rings flush with the ends of the piston, the compression gets behind them, thereby compelling a snugging contact against the wall of the cylinders, and this feature is of vital importance to both the timing and efficiency of an engine of the character under consideration.

By the interposition of the ring S on the exhaust piston, the same is adapted to travel between the intake and exhaust ports, and in operation the ring will closely contact with the surrounding wall of its cylinder and prevent any sucking in of exhaust gases when the power piston is moving out or down on its intake stroke; in other words any admixture of the exhaust gases with the incoming mixture during the intake stroke of the piston or plunger is obviated.

What I claim is:—

1. In combination with an engine having a cylinder, a piston valve within the cylinder having a gear connection with the main shaft of the engine whereby to constitute a power unit, a plunger within the cylinder, said piston valve having at the compression end thereof a packing ring, and an auxiliary ring spaced from the first mentioned ring and adapted to travel between the inlet and exhaust port of the cylinder.

2. In an engine of the character described, having a main cylinder with an extension thereon, and piston valves within said extension affording the sole control for the inlet and exhaust, said extension having an inlet port and an exhaust port, said piston valves being concentrically arranged, with the exhaust piston arranged outermost and having ports therein, the exhaust valve having at the extreme compression end thereof a packing ring, and having intermediate its end a packing ring adapted to travel between the intake and exhaust ports.

3. In an engine of the character described, the combination of a main cylinder, and piston valves within said cylinder affording the sole control for the inlet and the exhaust, said cylinder having an inlet port and an exhaust port, and the said piston valves being concentrically arranged, with the exhaust piston placed outermost and having ports therein, the exhaust piston having at the extreme compression end thereof a packing ring, and having intermediate its end a packing ring adapted to travel between the intake and the exhaust ports.

4. In an engine of the character described, the combination of a main cylinder, and piston valves within said cylinder affording the sole control for the inlet and the exhaust, said cylinder having an inlet port and an exhaust port, and the said piston valves being concentrically arranged with the exhaust piston placed outermost and having ports therein, the exhaust piston having at the extreme compression end thereof a packing ring, and having intermediate its end a packing ring adapted to travel between the intake and the exhaust ports, and the cooperating piston having a packing at the extreme compression end thereof.

In testimony whereof I hereunto affix my signature in the presence of two witnesses.

BARTLETT HOMER CHAPPELL.

Witnesses:
 ETHEL CAHN,
 G. A. SACKETT.